United States Patent [19]

Spruck et al.

[11] Patent Number: 5,682,567
[45] Date of Patent: Oct. 28, 1997

[54] PROCESS FOR EXPOSURE CONTROL IN MICROSCOPE CAMERAS AND CORRESPONDING PHOTOMICROSCOPE

[75] Inventors: Bernd Spruck, Mögglingen; Gerhard Herrmann, Aalen, both of Germany

[73] Assignee: Carl-Zeiss-Stiftung, Heidenheim, Germany

[21] Appl. No.: 533,223

[22] Filed: Sep. 25, 1995

[30] Foreign Application Priority Data

Sep. 27, 1994 [DE] Germany .................. 44 34 476.4

[51] Int. Cl.$^6$ .................. G03B 17/48; G03B 21/00
[52] U.S. Cl. .................. 396/432; 396/268; 359/368; 359/381
[58] Field of Search .................. 354/79, 458, 459, 354/479; 396/432, 250–255, 268, 272

[56] References Cited

U.S. PATENT DOCUMENTS

| | | | |
|---|---|---|---|
| 3,633,481 | 1/1972 | Kuhl | 354/79 |
| 4,041,504 | 8/1977 | Iodvalkis et al. | 354/458 |
| 4,089,015 | 5/1978 | Uno et al. | 354/458 |
| 4,293,208 | 10/1981 | Bagdis | 354/29 |
| 4,318,594 | 3/1982 | Hanada | 350/433 |
| 4,318,599 | 3/1982 | Elger | 354/79 |
| 4,357,084 | 11/1982 | Kimura | 354/459 |
| 4,384,773 | 5/1983 | Hambly | 354/459 |
| 4,475,802 | 10/1984 | Onogi | 354/79 |
| 4,619,512 | 10/1986 | Kiyohara | 354/458 |
| 4,630,917 | 12/1986 | Maida et al. | 354/458 |
| 5,239,171 | 8/1993 | Takabayashi et al. | 354/79 |

FOREIGN PATENT DOCUMENTS 4230724   10/1993   Germany .

*Primary Examiner*—Safet Metjahic
*Assistant Examiner*—Michael Dalakis

[57] ABSTRACT

Before the exposure of a film, the brightness of the microscope image is determined with a sensor by multiple constant ($\tau$) which characterizes the dependence of the microscope image with time is determined. The film is subsequently exposed for a single exposure time ($D_e$) which takes into account the dependence with time of the microscope image. The process is particularly suitable for microphotography of fluorescence pictures with fluorescence which bleaches out (fading). By the display of both the time constant ($\tau$) and also the required exposure time, it can be estimated in advance, before exposure of the film, whether the dependence of the fluorescence on time permits microphotography with a sufficient exposure of the film, in the microscope conditions which have been set. A multiple exposure of the film is not required. A photodiode is provided for exposure measurement, and its photocurrent is integrated over time, the integration time being varied in dependence on the exposure measurement signal.

9 Claims, 2 Drawing Sheets

PROCESS FOR EXPOSURE CONTROL IN MICROSCOPE CAMERAS AND CORRESPONDING PHOTOMICROSCOPE

BACKGROUND OF THE INVENTION

1. Field of the Invention

The invention relates to a process for exposure control in microscope camera, and a photomicroscope which operates according to the process.

In microphotography, and in particular when taking fluorescence pictures, the so-called fading effect takes place in the case of many fluorescent dyes. This leads to bleaching of the fluorescence and causes a time dependence of the image brightness. In the first approximation, the fluorescence intensity decreases from an initial value according to an exponential function of time, in which the time constant of the decrease depends on the nature of the fluorescent dye, and as a rule is in the region of about a few milliseconds to about a few seconds.

2. Discussion of Prior Art

This time dependence of the fluorescence is not troublesome when, as disclosed in U.S. Pat. No. 4,318,594, the amount of light incident on a sensor is continuously measured during the exposure of the film and is integrated by means of an integrator, and the shutter is closed only after reaching a predetermined amount of charge at the integrator. However, continuous measurement of brightness during the exposure of the film has the disadvantage that a portion of the light has to be deflected to the sensor by a beam splitter during the film exposure, and hence is not available for exposure of the film.

The last-named problem can be circumvented according to German Patent 4,230,724-C1, by the brightness measurement and the film exposure taking place one after the other, as is usual in photographic cameras. All of the light can be deflected by means of a mirror to the sensor during brightness measurement, and can be deflected to the photographic film during the film exposure, by folding the mirror away. A first brightness measurement is thus taken before the exposure of the film, and subsequently the camera shutter is opened for the exposure time determined from the brightness measurement. Since a possible bleaching of the fluorescence is not considered in the calculation of the exposure time, a second brightness measurement is made after the closing of the camera shutter, and it is decided by a comparison of the two brightness measurements whether an additional exposure is deemed to be appropriate and necessary. In that case, the camera shutter is opened for a further time, calculated from the two brightness measurements.

If in this known process the exposure time determined from the first measurement is larger than the time constant of the bleaching of the fluorescence, the film remains underexposed after the first phase of exposure. Also, an additional exposure following a second exposure phase is inappropriate, since the remaining fluorescence intensity is no longer sufficient to compensate for the incorrect exposure. Moreover, opening and closing the camera shutter always gives rise to vibrations, due to which, at high microscope magnifications, slight relative displacement of the object details in the photographic image can occur during the two exposure phases. Hence, the camera, or the camera shutter, has to be uncoupled, in terms of the transmission of vibration, from the microscope stand.

SUMMARY OF THE INVENTION

The object of the present invention is to provide a process for exposure control in microscope cameras and a corresponding photographic microscope, in which the disadvantages arising in the prior art are prevented. Thus, the process is to take account of bleaching of the fluorescence during exposure of the film. In addition, relative displacements in the photographic image are to be prevented, even at the highest magnifications. The process is moreover to permit deflection of the entire light of the photographic beam path to the film during film exposure. Preferably, faulty exposures which arise due to unfavorable relationships of the exposure time and the fading time of the fluorescence are to be largely prevented.

According to the invention, the image brightness of the microscope image before film exposure is determined with a sensor by multiple measurement or time-resolved measurement. The dependence of the fluorescent light on time is then determined from these brightness measurements, and only then is the film exposed for an exposure time which is suited to the dependence of the fluorescent light with time.

Since the brightness measurement and the film exposure take place successively, the entire light available in the photographic beam path can be deflected to the sensor during the brightness measurement, and to the film during film exposure. Separation of a portion to the light and passing it to the sensor is thus not required. Since the dependence of the fluorescent light on time is determined before the film exposure, it is possible to judge before the film exposure takes place, by comparing the dependence of the fluorescent light on time with the required exposure time, whether taking a sufficiently exposed photograph is indeed at all possible. Incorrect exposures, in particular underexposures, are thereby preventable.

In an advantageous embodiment, the determination of the image brightness takes place by integration over time of the current through the sensor. Such an integrating measurement is distinguished by high measurement sensitivity, so that a photodiode is suitable as the sensor, even for very weak fluorescence images. In order moreover to ensure a sufficiently large dynamic range of the brightness measurement, it is furthermore advantageous to provide integration times which can be varied corresponding to the image brightness of the microscope image. Such an arrangement is comparable to a photomultiplier with respect to its dynamic range and its measurement sensitivity, but the arrangement is substantially more compact and more cost-effective than a photomultiplier. Moreover, a high voltage is not required.

Brightness measurement by integration of a photodiode current is in fact basically known for conventional photographic cameras, for example from U.S. Pat. No. 4,293,208. However, predetermined and variable integration times are not used there. The voltage arising at the integrator is fed with hysteresis to a comparator, and the output voltage of the comparator is fed back to the integrator in a manner such that an oscillator results whose frequency represents a measure of the intensity incident on the photodiode.

To prevent erroneous measurements, a time constant which characterizes the time dependence of the image brightness is calculated and is indicated on a display. It can then be immediately determined, by comparison of this time constant with the required exposure time, whether a microphotograph with a sufficient exposure is at all possible. Then if, for example, the time constant of the image brightness is considerably smaller than the exposure time, sufficient exposure of the film will not take place, even after an arbitrarily long exposure time. The display can be a component of a special operating panel which also serves for input. Alternatively, the display can be realized as a computer monitor, and the input can then take place via the input means of the computer, such as a keyboard, mouse, etc.

To determine the time constant, the image brightness can be determined by means of the sensor at two time intervals which are spaced apart in time, and the time constant can be calculated in an evaluation device from the difference of the sensor signals in the two time intervals.

BRIEF DESCRIPTION OF THE DRAWINGS

The invention is described in greater detail below, with reference to the embodiments illustrated in the accompanying drawings, in which.

DETAILED DESCRIPTION OF PREFERRED EMBODIMENTS

Figure 1:
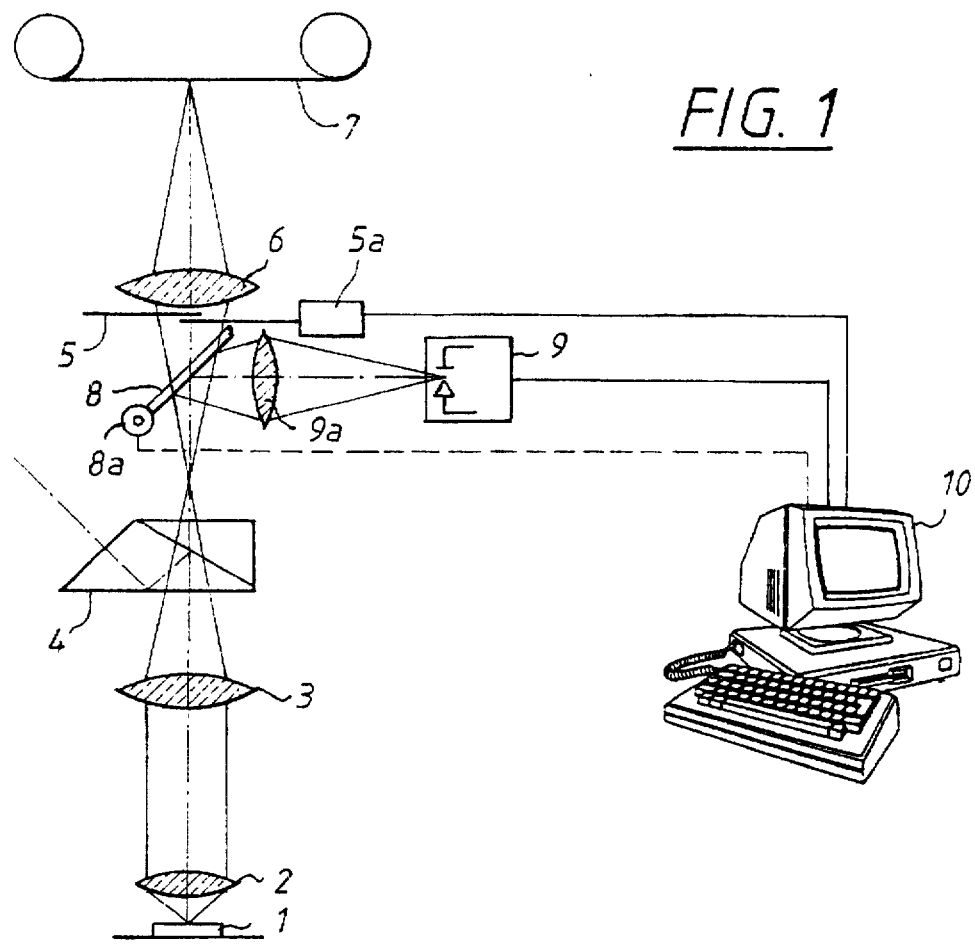
FIG. 1: is a sketch illustrating the principles of the beam path in a photomicroscope.

The photomicroscope in FIG. 1 has a conventional construction in terms of the construction of the opto-mechanical components. It essentially consists of a microscope, which is indicated here by the objective (2) shown as a single lens, the tube lens (3), and a prism (4) which serves to deflect the beam into the ocular, which is not shown. The prism (4) can then be arranged, in a well known manner which is not shown, in a prism slide with several switching positions, so that in one switching position the whole observation beam path can be allowed to pass into the phototube which begins above the prism (4). The required illuminating device is likewise not shown; during fluorescence observation, it is reflected into the microscope beam by means of a dichroic beam splitter between the objective (2) and the tube lens (3).

A switchable mirror (8), which can be moved in and out of the beam path, is arranged in the beam path, behind the prism (4) in the beam direction. When the switchable mirror (8) is moved into the beam path, the whole light of the photo beam path is deflected in the direction towards the sensor (9) for brightness measurement and is focused on it by means of a lens (9a) arranged in the beam path. The lens (9a) and the light-sensitive surface of the sensor (9) are set relative to each other such that only the central portion which makes up about 3% of the surface of the image field of the object (1) falls on the light-sensitive surface of the sensor (9). This so-called spot measurement is particularly advantageous for the microphotography of fluorescence images since, for brightness measurement, only that region of the sample (1) is made use of for brightness measurement which is of particular interest and is brought by the observer into the middle of the image field.

With the switchable mirror (8) pivoted out of the beam path, all the light of the photo beam path is allowed to pass through in the direction towards the film of the photocamera. The object (1) is imaged on the film (7) by the succeeding photographic objective (6). For this purpose, the drives (5a) and (8a) of the shutter (5) and of the switchable mirror (8) are connected, via a processor of the sensor (9) which is described in more detail below, to the computer (10) by means of one of its standard interfaces, corresponding to the description in U.S. Pat. application Ser. No. 08/492,180, filed Jun. 19, 1995. Means for reflecting in additional information, corresponding to this Patent Application, can of course also be provided here, in a manner which is not shown, and can be controlled by the computer (10).

Figure 2:
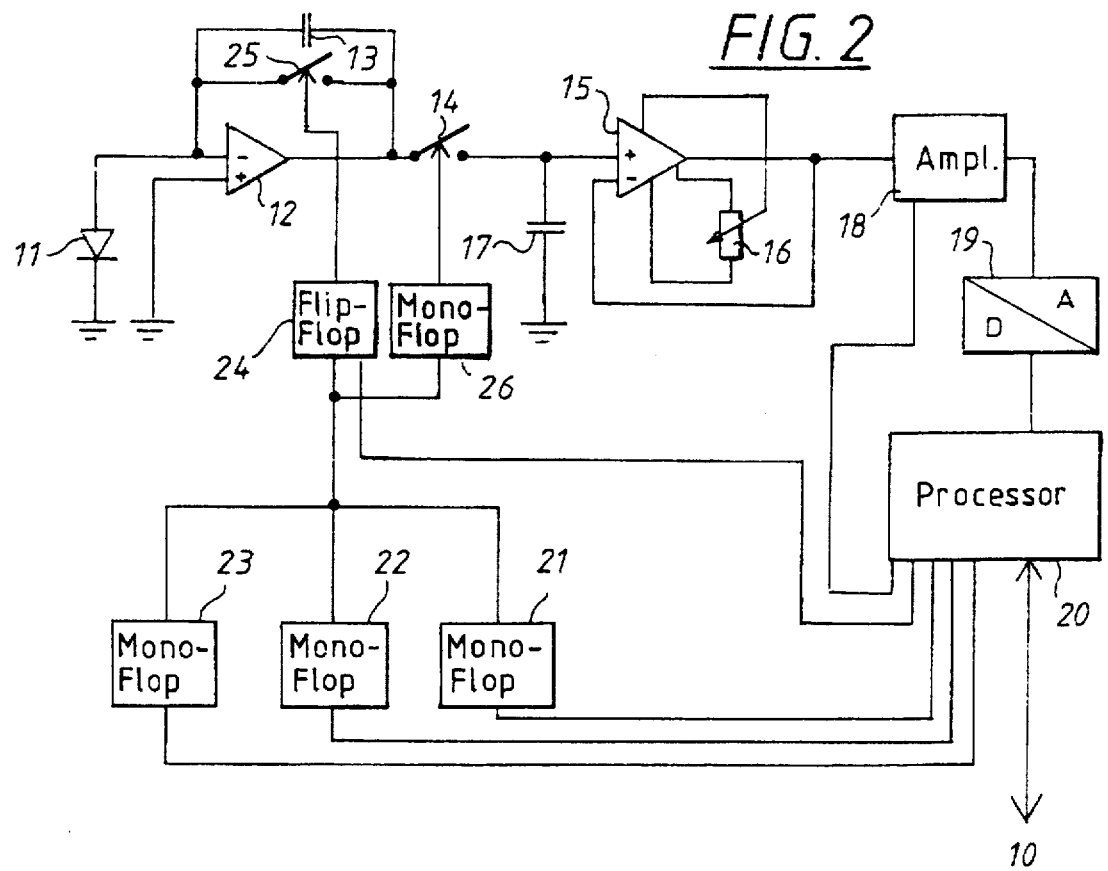
FIG. 2: is a block circuit diagram for brightness measurement in the photomicroscope of FIG. 1.

The specific circuit arrangement of the sensor (9) can be gathered from the block circuit diagram of FIG. 2. A photodiode (11) is used as the light detector, and has one pole connected to ground and a second pole connected to the inverting input of an operational amplifier (12). The non-inverting input of the operational amplifier (12) is likewise connected to ground. The output of the operational amplifier is fed back to the inverting input of the operational amplifier (12) via a capacitor (13) with a capacity of 100 pF. The capacitor (13) can be discharged by means of a switch (25) in the feedback circuit. The circuit so far described can be disconnected from the succeeding evaluation electronics by means of a further switch (14) located after the output of the operational amplifier (12). The operational amplifier (12) with feedback via the capacitor (13) forms an integrator, by means of which the photocurrent produced by the photodiode (11) is integrated and a voltage signal is produced which is proportional to the time integral. The commercial component ACF 201, made by the Burr-Brown Company, Tucson, Ariz., can be used for this integration of the photocurrent.

The output of the integrator is connected via the switch (14) to the non-inverting input of a second operational amplifier, the output of which is fed back to its inverting input. This second operational amplifier (15) forms, with a 10 nF capacitor (17) present in the non-inverting input circuit, a sample and hold circuit. The offset of the sample and hold circuit can be equalized by means of a potentiometer (16) in the amplifier circuit.

The output of the sample and hold circuit passes to an amplifier (18) which can be changed over between gains of unity and ten. The output signals of the amplifier (18) are digitized in the succeeding analog/digital converter and are fed to a microprocessor (20), which controls the time course of the exposure measurement, as described below. The microprocessor can in principle be embodied by the central processing unit (CPU) of the computer. In the specifically described embodiment, the microprocessor is however arranged, in common with the whole circuit according to FIG. 2, in a photocomponent (phototube) which can be put in place on the microscope, and is connected to the computer only for data input and output. A reduced evaluation time for the brightness measurement thus results, and with high flexibility, since the computer can also be replaced as the user desires, by an operating panel for data input and output.

For controlling the brightness measurement, the microprocessor (20) is moreover connected to three monostable flip-flops (monostables) (21, 22, 23), for changing the amplification of the amplifier (18), and also for changing the integration time of the integrator (12, 13), and furthermore controlling the closing of the switches (14) and (25) for predetermined times and the subsequent opening of both switches again.

The brightness measurement with the circuit according to FIG. 2 then proceeds as follows. In the operative state, and thus before taking the picture, the reset switch (25) and the selection switch (14) are both closed. The amplifier (18) is set to unity gain. A start signal of the microprocessor (20) switches the monostable (21) into the unstable state and simultaneously triggers the flip-flop (24), so that the reset switch (25) is opened. The photocurrent of the photodiode (11) is integrated by the integrator (12, 13) in this time, and the capacitor (17) of the sample and hold circuit is correspondingly charged. After 50 μ sec, the switching time of the monostable (21), the monostable (21) switches back into the stable state. This has the effect that the selection switch (14) is opened for a time which is predetermined by a further monostable (26), and the reset switch (25) is closed again by the flip-flop(14). Simultaneously with the opening of the selection switch (24), the analog/digital converter (19) is triggered, and digitizes the output signal of the sample and hold circuit (15, 17). After the digitizing of the output signal, the selection switch is closed again, and the sample and hold circuit (15, 17) is discharged, by the monostable (26). In this case, the period for which the monostable (26) remains in the unstable state is about 2 μ sec.

When the digital signal delivered by the 12-bit A/D converter (19) amounts to less than 1/100 of the maximum output signal, the microprocessor (20) starts a new measurement; in this case, however, the integration time of the integrator (12, 13) is determined by the monostable (22), which remains 100 times longer—that is, 5 msec—in the unstable state than the monostable (21). If, this time also, the signal delivered by the A/D converter (19) amounts to less than 1/100 of the maximum signal, a third measurement is carried out, with the integration time once more a hundred times longer, that is, an integration time of 500 msec. If, finally, this signal is still not sufficient, a fourth brightness measurement is carried out, with the same integration but with 10-fold amplification by the amplifier (18).

In all, it has been found that photocurrents are measured well, down to below 200 femto-amperes, with the circuit according to FIG. 2 as described herein, and a dynamic range of $2 \cdot 10^8$ can be attained by the different integration times and by the subsequent amplification by the amplifier (18).

Figure 4:
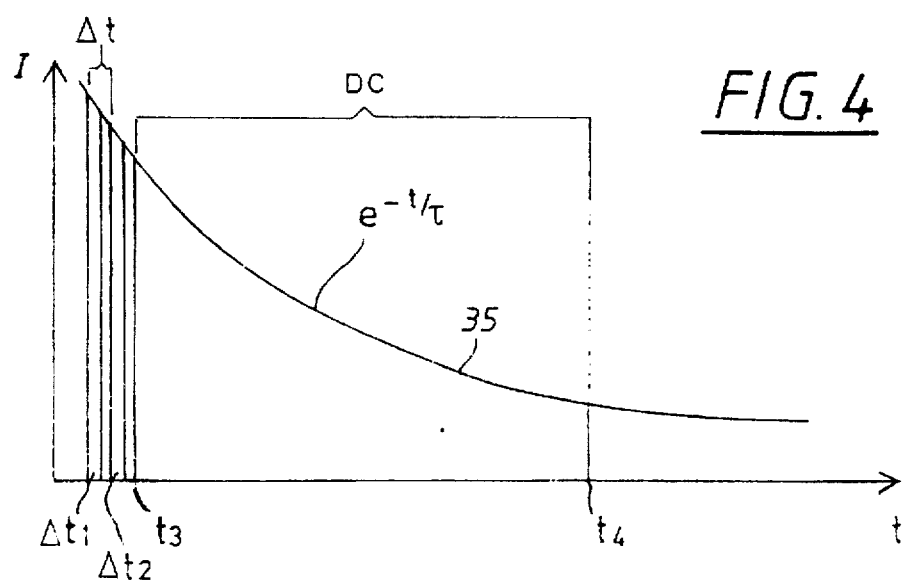
FIG. 4: is a diagram of a fluorescence intensity I which decays over time with a time constant $\tau$.
Figure 3:
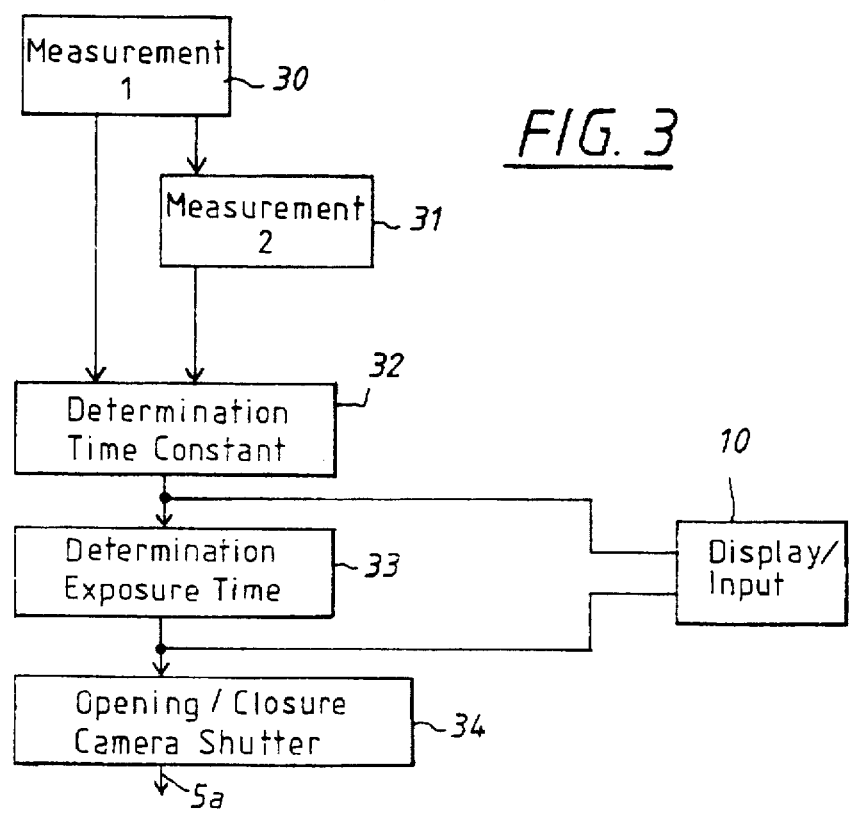
FIG. 3: is a flow diagram to explain the process steps which occur in the brightness measurement.

The whole course of the brightness measurement, as described with reference to FIG. 2, is symbolized in the flow diagram of FIG. 3 as a first step (30) denoted by "Measurement 1". The identical course of measurement is carried out a second time ("Measurement 2") in one step (31) for the fading correction when taking fluorescence pictures. The processor (20) then provides two successively taken brightness measurement values, from which the time constant τ, which characterizes the decrease of the fluorescence intensity in the measurement field, is then calculated in the processor in a calculation step (32). It is assumed in this calculation step that the fluorescence intensity decreases exponentially with time, as shown in FIG. 4, by the graph (35). The "Measurement 1" then provides a signal which is proportional to the light intensity integrated over the time interval ($\Delta t_1$), and the "Measurement 2" provides a corresponding signal for the second time interval ($\Delta t_2$). If the time interval between the two measurements is denoted by ($\Delta t$), the time constant is calculated in the processor (20) according to the equation:

$$\tau = \frac{\Delta t}{\ln(M1/M2)} \qquad \text{Equation (1)}$$

where M1 denotes the value measured in "Measurement 1" and M2 the value measured in "Measurement 2". In parallel with this, the exposure time D is calculated in the processor (20) from the brightness value of the second measurement, which resulted from a fluorescence intensity M2 which was constant with time. Both the time constant τ and also the exposure time D calculated in step (33) without taking into account a decay of the fluorescence, are displayed on the monitor of the computer (10). Furthermore, an exposure time $D_c$ which takes into account the dependence of the fluorescence intensity with time is calculated in step (33) corresponding to the following equation:

$$D_c = -\tau \ln\left(1 - \frac{D}{\tau}\right) \qquad \text{Equation 2}$$

This last-named exposure time $D_c$, which is required for a good exposure, is thus lengthened by a factor $$\alpha = -\frac{\tau}{D} \ln\left(1 - \frac{D}{\tau}\right) \qquad \text{Equation 3}$$

over the exposure time D which takes no account of the bleaching of the fluorescence. The processor (20) only then, in one step (34), controls the camera shutter (5a) and opens it for an exposure time $D_c$ which takes account of the decay of the fluorescence. The time point of opening of the camera shutter (5) is then denoted by ($t_3$) in FIG. 4, and the time point of closing by ($t_4$).

A time dependence of the fluorescence can be taken into account during a single exposure by the process described above. However, a multiple exposure is of course also possible in the process according to the invention, for example, in order to take several microscope pictures on one negative.

Furthermore, a Schwarzschild correction can also be additionally provided in the process according to the invention. Such a Schwarzschild correction is however to be added in as an additional correction of the exposure time $D_c$ only after the consideration of the fading.

We claim:

1. Process for exposure control in a microscope camera having a film, by which camera a microscope image is to be photographed, and which microscope image has a brightness that has a time dependence, comprising:

determining said brightness of said microscope image by separate and discrete multiple measurements or time-resolved multiple measurement with a sensor, and determining a quantity indicative of said time dependence of said brightness of said microscope image from said separate and discrete multiple measurements or said time-resolved multiple measurement before film exposure, comprising:

in a first measurement step, measuring said brightness of said microscope image with said sensor within a first time interval, in a second measurement step, measuring said brightness of said microscope image with said sensor within a second time interval spaced apart in time from said first time interval, calculating said quantity indicative of said time dependence from said first and second measurement steps before film exposure, and after said first and second measurements are completed, exposing said film for a single exposure time according to said time dependent brightness of said microscope image, taking into account said quantity indicative of said time dependence.

2. Process according to claim 1, further comprising determining image brightness by integrating current through said sensor over time.

3. Process according to claim 2, further comprising varying integration time according to image brightness.

4. Process according to claim 1, further comprising determining a time constant that characterizes time dependence of image brightness and displaying said time constant.

5. A photomicroscope having a photographic film camera for recording of a microscope image having an image brightness on a film in said film camera, comprising:

a camera shutter, a sensor for measuring said image brightness of said microscope image and generating signals according to said image brightness, an evaluation device associated with said sensor providing separate and discrete multiple measurements or time-resolved multiple measurement of said image brightness with said sensor, said evaluation device performing a first measurement of said brightness of said microscope image with said sensor within a first time interval and a second measurement of said brightness of said microscope image with said sensor within a second time interval spaced apart in time from said first time interval and determining an exposure time from said multiple measurements according to a time dependence of said image brightness, before exposure of said film, and a control device associated with said evaluation device providing an opening of said camera shutter for a single period of time according to said previously determined exposure time after said image brightness is determined.

6. A photomicroscope according to claim 5, wherein said sensor comprises a photodiode, further comprising an integrator associated with said photodiode for integration of current through said photodiode.

7. A photomicroscope according to claim 6, further comprising change means for changing integration time of said integrator.

8. A photomicroscope according to claim 5, further comprising a display for displaying an indication of said time dependence of said image brightness.

9. A photomicroscope according to claim 5, further comprising:

optics for transmitting a photographic beam along a beam path, a mirror, a positioning device for positioning said mirror into and out of said beam path so that all of said photographic beam is directed to said sensor when said mirror is positioned in said beam path and to a film when said mirror is positioned out of said beam path.

* * * * *